United States Patent
Gindel et al.

(10) Patent No.: US 10,764,406 B1
(45) Date of Patent: Sep. 1, 2020

(54) METHODS AND SYSTEMS FOR SENDING SENSOR DATA

(71) Applicant: Bose Corporation, Framingham, MA (US)

(72) Inventors: Christopher Gindel, Winchester, MA (US); Daniel Winchell Tellier, Pepperell, MA (US); Michelle Gelberger, Cambridge, MA (US); Laurie Jakubiak, Sutton, MA (US); Daniel Buckley, Newton, MA (US); Todd Richard Reily, North Reading, MA (US); Paul W. Calnan, III, Somerville, MA (US); Carlos Guilherme Batista Heil, Norwood, MA (US); Naganagouda B. Patil, Ashland, MA (US); Tambet Ingo, Tartu (EE)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/290,417

(22) Filed: Mar. 1, 2019

(51) Int. Cl.
| | |
|---|---|
| *H04W 4/38* | (2018.01) |
| *H04L 29/06* | (2006.01) |
| *G06F 9/50* | (2006.01) |
| *H04L 12/863* | (2013.01) |
| *H04L 12/851* | (2013.01) |

(52) U.S. Cl.
CPC ............ *H04L 69/08* (2013.01); *G06F 9/5038* (2013.01); *H04L 47/2483* (2013.01); *H04L 47/6215* (2013.01); *H04L 69/18* (2013.01); *H04W 4/38* (2018.02)

(58) Field of Classification Search
CPC ....... H04W 4/005; H04W 4/00; H04W 4/008; H04W 84/00; H04W 84/18
See application file for complete search history.

(56) References Cited

U.S. PATENT DOCUMENTS

| | | | |
|---|---|---|---|
| 8,238,567 | B2 | 8/2012 | Burge et al. |
| 8,238,570 | B2 | 8/2012 | Johnson, Jr. et al. |
| 8,243,946 | B2 | 8/2012 | Burge et al. |
| 8,699,719 | B2 | 4/2014 | Johnson, Jr. et al. |
| 9,743,170 | B2 | 8/2017 | Yamkovoy |
| 9,838,812 | B1 | 12/2017 | Shetye et al. |

(Continued)

OTHER PUBLICATIONS

International Search Report and the Written Opinion of the International Searching Authority, International Application No. PCT/US2020/020326, pp. 1-11, dated Jun. 5, 2020.

*Primary Examiner* — Mohamed A Kamara
(74) *Attorney, Agent, or Firm* — Bond, Schoeneck & King, PLLC

(57) ABSTRACT

An audio system and method for sending sensor data including a first wearable audio device having a speaker, a first communication module arranged to establish a first connection with a first peripheral device and obtain a first data characteristic of the first wearable audio device, and obtain a second data characteristic of a first application running on a first peripheral device, and a sensor arranged to obtain a sensor data. The first wearable audio device or the first peripheral device are arranged to: compare the first data characteristic and the second data characteristic, and send or receive the sensor data obtained from the sensor to the first peripheral device for use with the first application if the first data characteristic and the second data characteristic match.

23 Claims, 6 Drawing Sheets

(56) References Cited

U.S. PATENT DOCUMENTS

| | | | |
|---|---|---|---|
| 9,860,626 | B2 | 1/2018 | Ergezer et al. |
| 9,924,255 | B2 | 3/2018 | Patel et al. |
| 10,045,111 | B1 | 8/2018 | Bonner et al. |
| 10,080,092 | B2 | 9/2018 | Shetye et al. |
| 10,257,602 | B2 | 4/2019 | Kofman |
| 2004/0024884 | A1* | 2/2004 | Rekimoto ............. G06F 1/1613 709/228 |
| 2008/0233877 | A1* | 9/2008 | Gwee .................. H04W 84/18 455/41.3 |
| 2012/0002822 | A1 | 1/2012 | Peissig et al. |
| 2013/0055103 | A1* | 2/2013 | Choi ....................... G06F 3/017 715/740 |
| 2016/0077892 | A1 | 3/2016 | Hendri et al. |
| 2016/0274776 | A1* | 9/2016 | Scheff .................... G06T 11/60 |
| 2016/0357509 | A1* | 12/2016 | Alsina .................... G11B 27/11 |
| 2017/0161175 | A1 | 6/2017 | Aluru et al. |
| 2018/0014108 | A1 | 1/2018 | Dragicevic et al. |
| 2019/0052951 | A1 | 2/2019 | Kofman et al. |

\* cited by examiner

METHODS AND SYSTEMS FOR SENDING SENSOR DATA

BACKGROUND

The present disclosure relates generally to wireless systems and methods, specifically, wireless audio systems which send and receive sensor data.

SUMMARY OF THE DISCLOSURE

The present disclosure relates to systems and methods for sending sensor data from a first wearable audio device to a first peripheral device for use with a first application or a second application running on the peripheral device if a firmware characteristic of the first wearable audio device matches with a data characteristic of either the first application or the second application.

In one aspect there is provided a method for sending sensor data, the method including: providing a first wearable audio device having a speaker, a first communication module, and a sensor; establishing, via circuitry of a first peripheral device, a first connection over a first protocol between the first wearable audio device and the first peripheral device; obtaining, via the first communication module, a first data characteristic of the first wearable audio device; obtaining, via the first communication module, a second data characteristic of a first application running on the first peripheral device; comparing the first data characteristic of the first wearable audio device with the second data characteristic of the first application; and, sending the sensor data obtained from the sensor of the first wearable audio device to the first peripheral device for use with the first application if the first data characteristic of the first wearable audio device and the second data characteristic of the first application match.

In an aspect, the method includes: obtaining, via the first communication module, a third data characteristic of a second application running on the first peripheral device; comparing the first data characteristic of the first wearable audio device with the third data characteristic of the second application; and, sending the sensor data obtained from the sensor of the first wearable audio device to the first peripheral device for use with the second application if the first data characteristic of the first wearable audio device and the third data characteristic of the second application match.

In an aspect, the method includes: receiving a first user input; and, modifying the first data characteristic to match the second data characteristic upon receiving the first user input.

In an aspect, the method includes: determining whether the first application is in a foreground of a user interface of the first peripheral device; and, modifying the first data characteristic to match the second data characteristic upon determining that the first application is in the foreground of the user interface.

In an aspect, the method includes: determining a first priority of the first application; determining a second priority of the second application; and, modifying the first data characteristic to match the second data characteristic if the first priority is higher than the second priority; or modifying the first data characteristic to match the third data characteristic if the second priority is higher than the first priority.

In an aspect, the first user input is selected from: a hardware input, a gesture input, data obtained from a gyroscope, data obtained from an accelerometer, or data obtained from a magnetometer.

In an aspect, the method includes: receiving a first user input; and, modifying the first data characteristic to match the third data characteristic upon receiving the first user input.

In an aspect, the method includes: determining whether the second application is in a foreground of a user interface of the first peripheral device; and, modifying the first data characteristic to match the third data characteristic upon determining that the second application is in the foreground of the user interface.

In an aspect, the first wearable audio device further comprises a memory arranged to store a set of non-transitory computer readable instructions and a processor arranged to execute the set of non-transitory computer readable instructions, wherein the memory is further arranged to store a firmware data set.

In an aspect, the firmware data set comprises the first data characteristic and the first data characteristic is obtained from at least a portion of the first protocol used in the first connection.

In an aspect, the first application contains a first application data set wherein the first application data set comprises the second data characteristic, and wherein the second data characteristic is obtained from the first application data sent via at least a portion of a first protocol used in the first connection.

In an aspect, the second application contains a second application data set wherein the second application data set comprises the third data characteristic, and wherein the third data characteristic is obtained from the second application data sent via at least a portion of the first protocol used in the first connection.

In an aspect, the sensor is selected from: a gyroscope, an accelerometer, and/or a magnetometer.

In an aspect, there is provided an audio system, the audio system including: a first wearable audio device, the first wearable audio device including: a speaker, a first communication module arranged to establish a first connection with a first peripheral device and obtain a first data characteristic of the first wearable audio device, and obtain a second data characteristic of a first application running on a first peripheral device, and a sensor arranged to obtain a sensor data. The first wearable audio device or the first peripheral device are arranged to: (i) compare the first data characteristic and the second data characteristic; and, (ii) send or receive the sensor data obtained from the sensor to the first peripheral device for use with the first application if the first data characteristic and the second data characteristic match.

In an aspect, the first communication module is further arranged to obtain a third data characteristic of a second application running on the first peripheral device and the first wearable audio device or the first peripheral device are further arranged to: compare the first data characteristic with the third data characteristic of the second application; and, send or receive the sensor data obtained from the sensor to the first peripheral device for use with the second application if the second data characteristic and the third data characteristic match.

In an aspect, the first wearable audio device or the first peripheral device are further arranged to: receive a first user input; and, modify the first data characteristic to match the second data characteristic upon receiving the first user input.

In an aspect, the first wearable audio device or the first peripheral device are further arranged to: determine whether the first application is in a foreground of a user interface of the first peripheral device; and, modify the first data characteristic to match the second data characteristic upon determining that the first application is in the foreground of the user interface.

In an aspect, the first user input is selected from: a hardware input, a gesture input, data obtained from a gyroscope, data obtained from an accelerometer, or data obtained from a magnetometer.

In an aspect, the first wearable audio device or the first peripheral device are further arranged to: receive a first user input; and, modify the first data characteristic to match the third data characteristic upon receiving the first user input.

In an aspect, the first wearable audio device or the first peripheral device are further arranged to: determine whether the second application is in a foreground of a user interface of the first peripheral device; and, modify the first data characteristic to match the third data characteristic upon determining that the second application is in the foreground of the user interface.

In an aspect, the first wearable audio device or the first peripheral device are further arranged to: determine a first priority of the first application; determine a second priority of the second application; and, modify the first data characteristic to match the second data characteristic if the first priority is higher than the second priority; or modify the first data characteristic to match the third data characteristic if the second priority is higher than the first priority.

In an aspect, the first wearable audio device further comprises a memory arranged to store a set of non-transitory computer readable instructions and a processor arranged to execute the set of non-transitory computer readable instructions, wherein the memory is further arranged to store a firmware data set.

In an aspect, the firmware data set comprises the first data characteristic and the first data characteristic is obtained from at least a portion of the first protocol used in the first connection.

In an aspect, the first application contains a first application data set wherein the first application data set comprises the second data characteristic, and wherein the second data characteristic is obtained from the first application data sent via at least a portion of a first protocol used in the first connection.

In an aspect, the second application contains a second application data set wherein the second application data set comprises the third data characteristic, and wherein the third data characteristic is obtained from the second application data sent via at least a portion of the first protocol used in the first connection.

In an aspect, the sensor is selected from: a gyroscope, an accelerometer, and/or a magnetometer.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to systems and methods for sending sensor data from a first wearable audio device to a first peripheral device for use with a first application or a second application running on the peripheral device if a firmware characteristic of the first wearable audio device matches with a data characteristic of either the first application or the second application.

Figure 1:
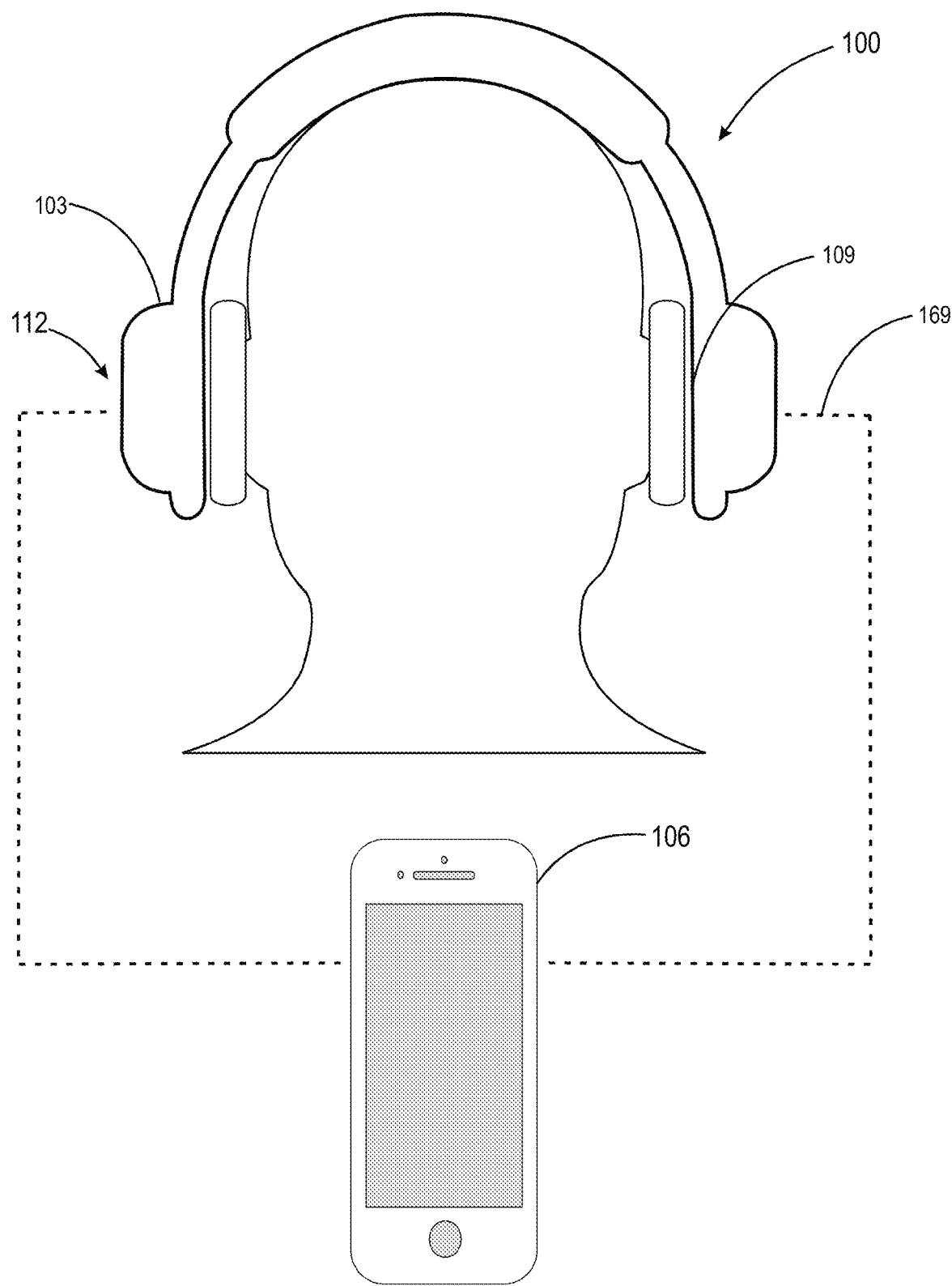
FIG. 1 is a schematic view of an audio system according to the present disclosure.

The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show a single wearable audio device, having a pair of earcups (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of an around-ear headset, in other examples the headset may be an in-ear, on-ear, or near-ear headset. In some examples, a wearable audio device may be an open-ear device that includes an acoustic driver to radiate acoustic energy towards the ear while leaving the ear open to its environment and surroundings.

The following description should be read in view of FIGS. 1-4B. FIG. 1 is a schematic view of audio system 100 according to the present disclosure. Audio system 100 includes a first wearable audio device 103 and first peripheral device 106 discussed below. Although illustrated in FIG. 1 as a pair over-ear headphones, it should be appreciated that first wireless audio device 103 could be any type of headphone or wearable device capable of establishing a wireless or wired data connection with first peripheral device 106.

Figures 2A, 2B:
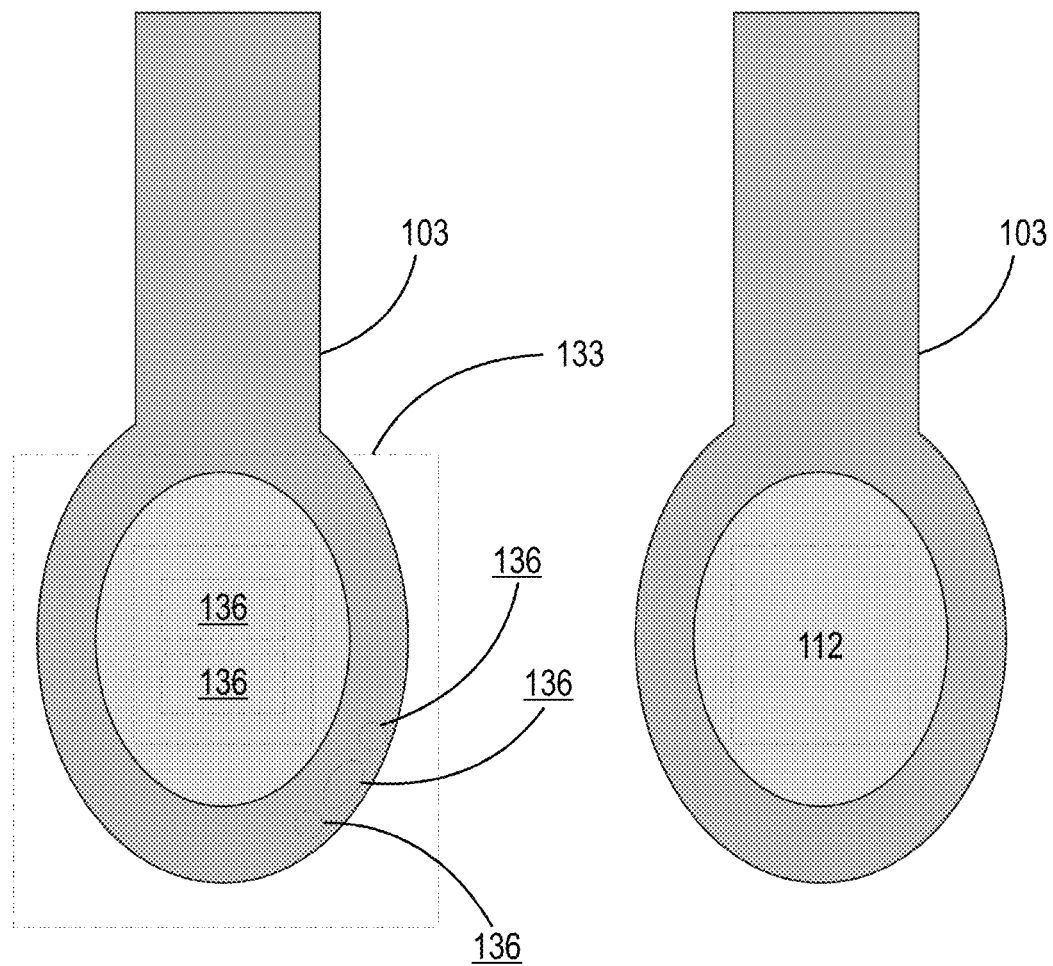
FIG. 2A is a right-side perspective view of a wearable audio device according to the present disclosure.
FIG. 2B is a left-side perspective view of a wearable audio device according to the present disclosure.
Figure 4A:
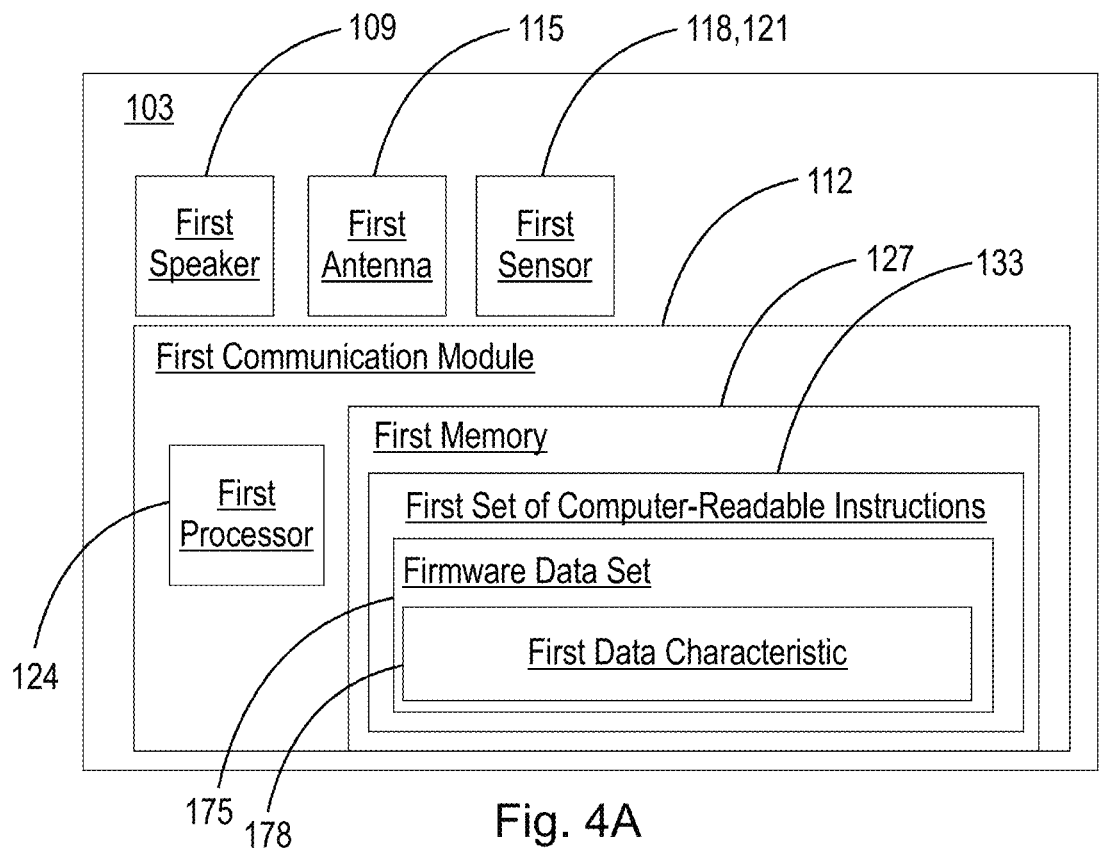
FIG. 4A is a schematic view of the electronic components of a wearable audio device according to the present disclosure.
Figure 4B:
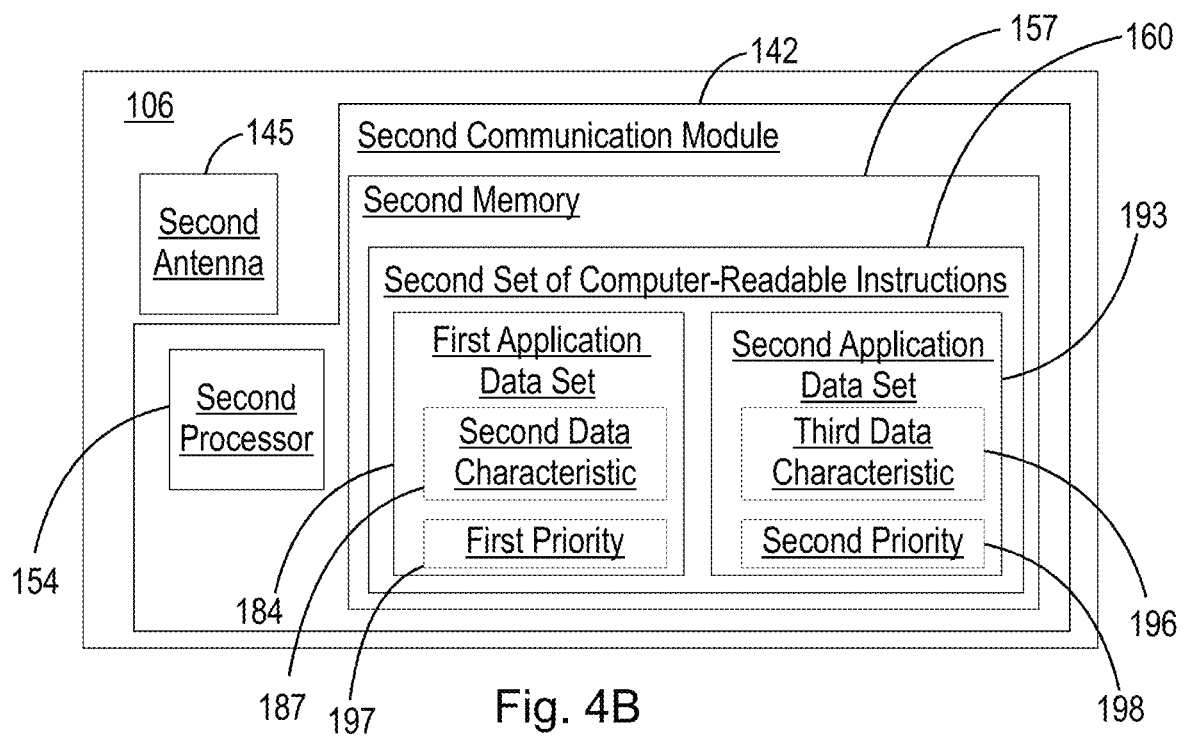
FIG. 4B is a schematic view of the electronic components of a peripheral device according to the present disclosure.

First wearable audio device 103 includes first speaker 109 and first communication module 112 (shown in FIGS. 2B and 4A). First speaker 109 (shown in 4A) is arranged to produce a first audio signal proximate at least one ear of a user in response to audio data sent and/or received from first communication module 112. First communication module 112 is arranged to send and/or receive data from an antenna, e.g., first antenna 115 as shown in FIG. 4A. The data received can be, e.g., audio data or communication data sent and/or received from a plurality of external devices, e.g., first peripheral device 106. It should be appreciated, that first communication module 112 can be operatively connected to processor 124 (shown in FIG. 4A) and first memory 127 (shown in FIG. 4A) operatively arranged to execute and store a first set of non-transitory computer-readable instructions 130 (shown in FIG. 4A), as well as a battery or other power source (not shown).

Furthermore, first wearable audio device 103 includes a first sensor 118 (shown in FIG. 4A) arranged on or within first wearable audio device 103. First sensor 118 can be selected from: a gyroscope, an accelerometer, a magnetometer or any other sensor capable of determining the position, angular velocity, orientation, acceleration, or direction with respect to a magnetic force of first wearable audio device 103. First sensor 118 is arranged to obtain sensor data 121 (schematically shown in FIG. 4A) and relay sensor data 121 to first communication module 112.

As shown in FIG. 2A, first wearable audio device 103 further includes a first user interface 133 having at least one user input 136. It should be appreciated that, although illustrated in FIG. 2A as a plurality of touch capacitive sensors or a series of buttons or slideable switches, first user interface 133 and user input 136 can take any form capable of receiving an input from a user. Additionally, although not discussed in detail, at least one user input 136 can be a signal generated by sensor 118 such that a motion or a gesture made by the user can serve as an input to first wearable audio device 103. FIGS. 2A-2B illustrate a right-side schematic view and a left-side schematic view, respectively, of first wearable audio device 103 having user first interface 133 and first input(s) 136. It should be appreciated that first interface 133 and first user input(s) 136 can be arranged on the right side or left side of first wearable audio device 103 in any order, pattern, or placement, and any conceivable combination thereof.

Figure 3:
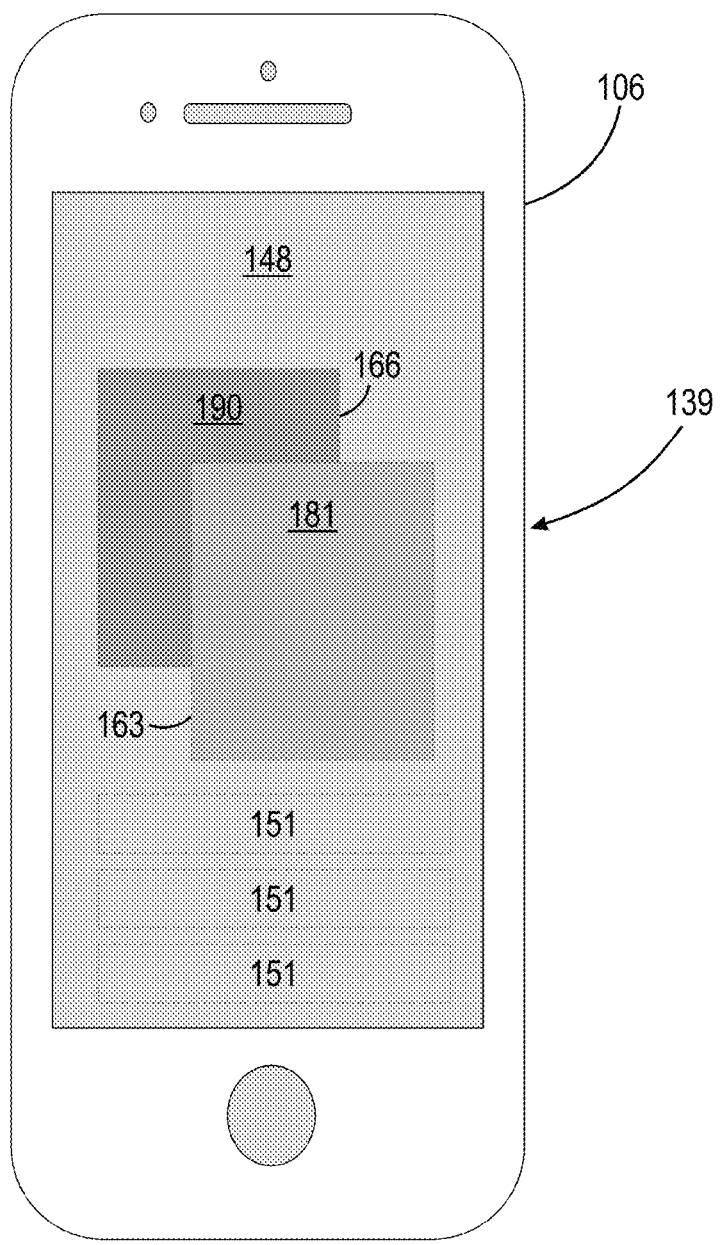
FIG. 3 is a schematic view of a peripheral device according to the present disclosure.

FIG. 3 illustrates a front schematic view of first peripheral device 106 according to the present disclosure. First peripheral device 106 includes circuitry 139 which can include second communication module 142 (shown in FIG. 4B) arranged to send and/or received data, e.g., audio data or communication data (e.g., data related to first connection 169—shown in FIG. 1) via a second antenna 145 (shown in FIG. 4B). First peripheral device 106 further includes second user interface 148 having at least one second input 151, and second processor 154 (shown in FIG. 4B) and second memory 157 (shown in FIG. 4B) arranged to execute and store a second set of non-transitory computer-readable instructions 160 (shown in FIG. 4B). Furthermore, although not discussed in detail, second user input 151 can be a signal generated by inertial sensors located on or within first peripheral device 106, e.g., an accelerometer, a gyroscope, and/or a magnetometer, such that a motion or a gesture made by the user can serve as an input for first peripheral device 106. Second user interface 148 further incudes a foreground 163 and a background 166. By engaging with second input 151 or performing a motion or gesture received by inertial sensors located on or in first peripheral device 106, the user can select an application (e.g., first application 181 or second application 190 discussed below) to be displayed in the foreground 163 of second user interface 148. Similarly, when an application is selected to be displayed in foreground 163, if there is another application running on first peripheral device 106 at that time, the other application will be placed in background 166 of second user interface 148. It should be appreciated that, although first application 181 is illustrated in foreground 163, and second application 190 is illustrated in background 166, which application is in foreground 163 of background 166 can be selected by the user as discussed in detail below.

First set of non-transitory computer-readable instructions 130 (shown in FIG. 4A) of first wearable audio device 103 further includes a firmware data set 175 having a first data characteristic 178. First data characteristic 178 can be a portion of software code associated with the firmware of first device 103, e.g., a small (4-bit) random string of characters, specific to the firmware data set of first wearable audio device 103. Additionally, as discussed above, first peripheral device 106 is arranged to execute a plurality of applications, for example, first application 181 and second application 190. First application 181 includes a first application data set 184 which can be software code stored and executed via second memory 157 and second processor 154 of first peripheral device 106, respectively. First application data set 184 contains computer-readable instructions, where at least a portion of first application data set 184 is associated with a second data characteristic 187, e.g., a small (4-bit) random string of characters specific to the first application data set of first application 181. Similarly, second application 190 includes a third application data set 193 which can be software code stored and executed via second memory 157 and second processor 154 of first peripheral device 106, respectively. Second application data set 193 contains computer-readable instructions, where at least a portion of second application data set 193 is associated with a third data characteristic 196, e.g., a small (4-bit) random string of characters specific to the second application data set 193 of second application 190. It should be appreciated that first data characteristic 178, second data characteristic 187, and third data characteristic 196 are transmitted, between first wearable audio device 103 and first peripheral device 106 via at least a portion of first connection 169 via first protocol 172 (discussed below).

During operation of audio system 100, first wearable audio device 103 or first peripheral device 106 are arranged to establish a first connection, i.e., first connection 169. For example, first antenna 115 of first communication module 112 may initiate/request a first connection 169 with first peripheral device 106 where the request is received and accepted via second antenna 145 of second communication module 142. Conversely, second antenna 145 of second communication module 142 may initiate/request first connection 169 with first wearable audio device 103 where the request is received an accepted via first antenna 115 of first communication module 112. In one example, first connection 169 is a wireless connection established between first communication module 112 and second communication module 142 using a wireless protocol, i.e., first protocol 172. It should be appreciated that first protocol 172 can be selected from: a Bluetooth protocol, a Bluetooth Low-Energy (BLE) protocol, a ZigBee protocol, a Wi-Fi (IEEE 802.11) protocol, or any other protocol for establishing a wireless connection between first wearable device 103 and first peripheral device 106. It should further be appreciated that first connection 169 may be a physical connection made between first wearable audio device 103 and first peripheral device 106, e.g., via a cable or cord arranged to send and/or receive audio data and communication data between first wearable audio device 103 and first peripheral device 106.

Once first connection 169 has been established between first wearable audio device 103 and first peripheral device 106, audio data and/or communication data can be exchanged between the devices via, e.g., first protocol 172. Furthermore, during use a user may initiate or cause to initiate first application 181 and/or second application 190. After initiating first application 181 and/or second application 190, first wearable audio device 103 and first peripheral device 106 may exchange, via first connection 169 using protocol 172, first data characteristic 178 of firmware data set 175, second data characteristic 187 of first application data set 184, and/or third data characteristic 196 of second application data set 193.

If only one application is running on first peripheral device 106, first wearable audio device 103 and/or first peripheral device 106 is/are arranged to compare first data characteristic 178 of firmware data set 175 and second data characteristic 187 of first application data set 184. In one example, if first data characteristic 178 and second data characteristic 187 match, sensor data, e.g., sensor data 121 obtained by sensor 118 of first wearable audio device 103 can be utilized by first application 181. If, after comparison, first data characteristic 178 and second data characteristic do not match, first data characteristic 178 can be overwritten such that first data characteristic 178 and second data characteristic 187 do match. In one example, first data characteristic 178 can be overwritten to match second data characteristic 187 of first application data set 184 if, e.g., first application 181 is in foreground 163 of second user interface 148. The position of first application 181 in foreground 163 of second user interface 148, indicates that the user is likely engaged with first application 181 and, therefore, sensor data 121 should be utilized by first application 181. It should be appreciated that after the comparison of first data characteristic 178 and second data characteristic 187, if first application 181 is in foreground 163 of second user interface 148, first data characteristic 178 of firmware data set 175 can automatically be overwritten to match second data characteristic 187 of first application data set 184, such that sensor data 121 is automatically sent to and received by first peripheral device 106 for use with first application 181. It should also be appreciated that, after the comparison of first data characteristic 178 and second data characteristic 187, if first application 181 is in foreground 163 of second user interface 148, first data characteristic 178 of firmware data set 175 can be overwritten to match second data characteristic 187 of first application data set 184 upon receiving a user input, e.g., first input(s) 136 of first wearable audio device 103 or second input 151 of first peripheral device 106, such that sensor data 121 is sent to and received by first peripheral device 106 for use with first application 181 upon a physical indication by the user.

If more than one application is running on first peripheral device 106, first wearable audio device 103 and/or first peripheral device 106 is/are arranged to compare first data characteristic 178 of firmware data set 175, second data characteristic 187 of first application data set 184, and third data characteristic 196 of second application data set 193. In one example, if first data characteristic 178 and second data characteristic 187 match, sensor data, e.g., sensor data 121 obtained by sensor 118 of first wearable audio device 103 can be utilized by first application 181. In another example, if first data characteristic 178 and third data characteristic 196 match, sensor data, e.g., sensor data 121 can be utilized by second application 190.

If, after comparison, first data characteristic 178 and second data characteristic do not match and first data characteristic 178 and third characteristic 196 also do not match, first data characteristic 178 can be overwritten such that first data characteristic 178 matches either second data characteristic 187 or third data characteristic 196. In one example, a user may, via a user input, i.e., first user input(s) 136 of first wearable audio device 103 or second input(s) 151 of first peripheral device 106, position either first application 181 or second application 190 in foreground 163 of second user interface 148. It should be appreciated that only one application can be positioned in foreground 163 at any given time while any number of applications can be positioned in background 166 of second user interface 148. A user may alternatively, via a user input, i.e., first user input(s) 136 of first wearable audio device 103 or second input(s) 151 of first peripheral device 106 select either first application 181 or second application 190 as the application to receive sensor data 121 obtained by sensor 118 of first wearable audio device 103.

In one example, first data characteristic 178 can be overwritten to match second data characteristic 187 of first application data set 184 if, e.g., first application 181 is in foreground 163 of second user interface 148. The position of first application 181 in foreground 163 of second user interface 148, indicates that the user is likely engaged with first application 181 and, therefore, sensor data 121 should be utilized by first application 181. It should be appreciated that after the comparison of first data characteristic 178 and second data characteristic 187, if first application 181 is in foreground 163 of second user interface 148, first data characteristic 178 of firmware data set 175 can automatically be overwritten to match second data characteristic 187 of first application data set 184, such that sensor data 121 is automatically sent to and received by first peripheral device 106 for use with first application 181. It should also be appreciated that, after the comparison of first data characteristic 178 and second data characteristic 187, if first application 181 is in foreground 163 of second user interface 148, first data characteristic 178 of firmware data set 175 can be overwritten to match second data characteristic 187 of first application data set 184 upon receiving a user input, e.g., first input(s) 136 of first wearable audio device 103 or second input 151 of first peripheral device 106, such that sensor data 121 is sent to and received by first peripheral device 106 for use with first application 181 upon a physical indication by the user.

In one example, first data characteristic 178 can be overwritten to match third data characteristic 196 of second application data set 193 if, e.g., second application 190 is in foreground 163 of second user interface 148. The position of second application 190 in foreground 163 of second user interface 148, indicates that the user is likely engaged with second application 190 and, therefore, sensor data 121 should be utilized by second application 190. It should be appreciated that after the comparison of first data characteristic 178 and third data characteristic 196, if second application 190 is in foreground 163 of second user interface 148, first data characteristic 178 of firmware data set 175 can automatically be overwritten to match third data characteristic 196 of second application data set 193, such that sensor data 121 is automatically sent to and received by first peripheral device 106 for use with second application 190. It should also be appreciated that, after the comparison of first data characteristic 178 and third data characteristic 196, if second application 190 is in foreground 163 of second user interface 148, first data characteristic 178 of firmware data set 175 can be overwritten to match third data characteristic 196 of second application data set 193 upon receiving a user input, e.g., first input(s) 136 of first wearable audio device 103 or second input 151 of first peripheral device 106, such that sensor data 121 is sent to and received by first peripheral device 106 for use with second application 190 upon a physical indication by the user.

Additionally, as an alternative to automatically or manually overwriting first data characteristic 178 when an application is in the foreground 163 of second user interface 148, it should be appreciated that first application data set 184 and second application data set 193 may utilize a priority structure to automatically indicate which application should receive sensor data 121 over the other. For example, first application data set 184 may include a portion dedicated to a first priority 197 where first priority 197 may be an alpha numeric character indicating the intended importance within the priority structure of first application 181. Additionally, second application data set 193 may include a portion dedicated to a second priority 198, where second priority 198 may be an alpha numeric character indicating the intended importance of second application 190 within the priority structure. In one example, first priority 197 may be associated with a high priority application (using an alpha numeric character of e.g., 1) while second priority 198 may be associated with a lower priority application (using an alpha numeric character of e.g., 5). In the foregoing example, first application 181, as a higher priority application, may be an augmented reality application which requires the availability of sensor data 121 to promote a robust user experience, while second application 190, as a lower priority application, may be a digital audio library application or a weather application which less frequently requires the availability of sensor data 121 to promote a robust user experience. It should be appreciated that, in the event first data characteristic 178 does not match either second data characteristic 187 or third data characteristic 196, which application data characteristic overwrites first data characteristic 178, can be determined automatically, upon an additional comparison of first priority 197 and second priority 198. The data characteristic associated with the application with the higher priority will overwrite the first data characteristic and subsequently receive sensor data 121. In some examples, the user also manually enters a priority for one or more applications via a user interface, i.e., first user input(s) 136 of first wearable audio device 103 or second input(s) 151 of first peripheral device 106. In addition, priority may be determined using historical usage data of applications by the user.

Furthermore, although the example operational descriptions recited above utilized a first and second application operating on a single peripheral device, i.e., first application 181 and second application 190 running on first peripheral device 106, it should be understood that the comparisons between data characteristics and priority levels described above equally apply to situations with additional applications running on first peripheral device 106 and to situations with multiple peripheral devices each running any number of applications.

Figure 5A:
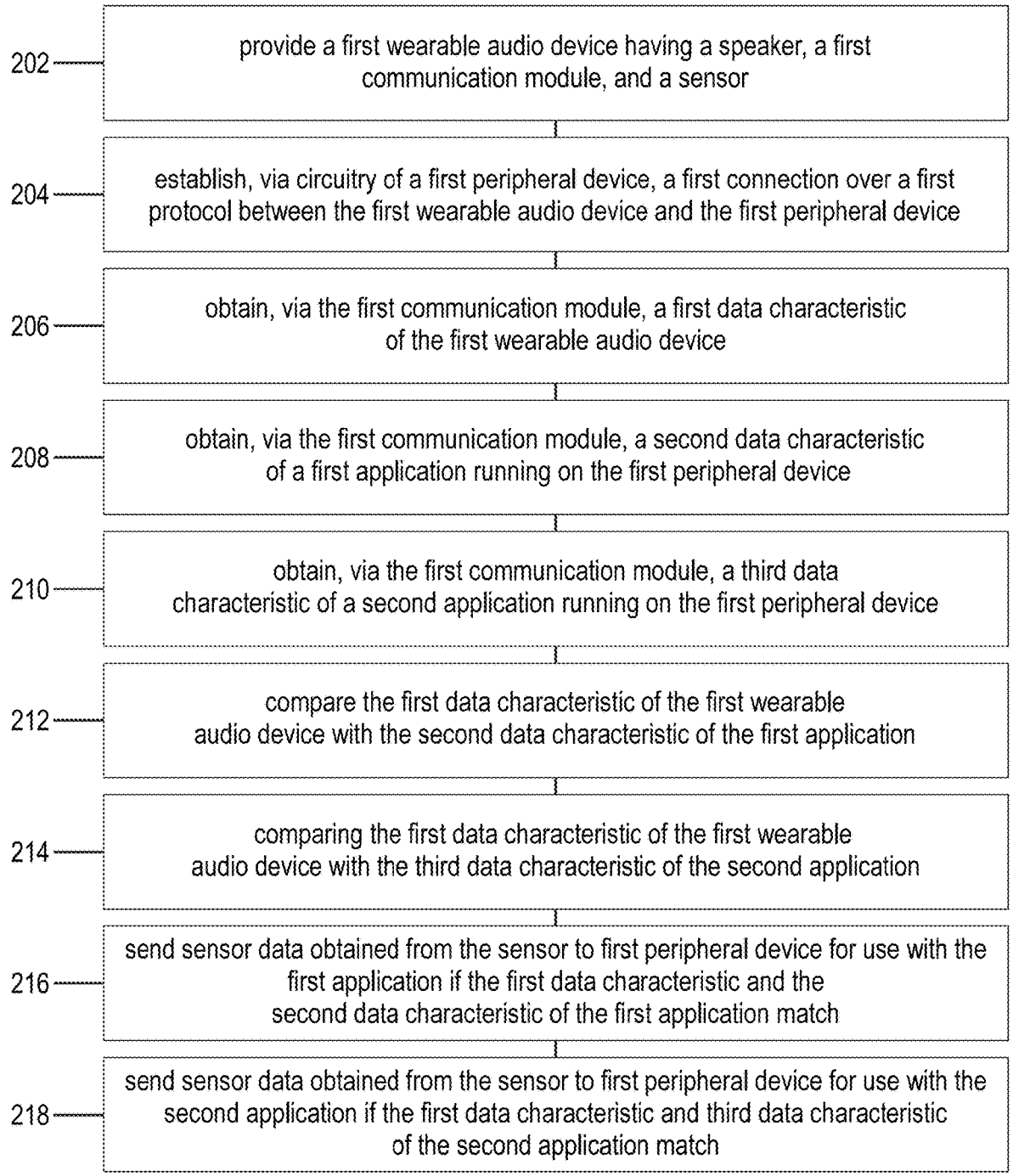
FIG. 5A is a flow-chart illustrating the steps of a method according to the present disclosure.
Figure 5B:
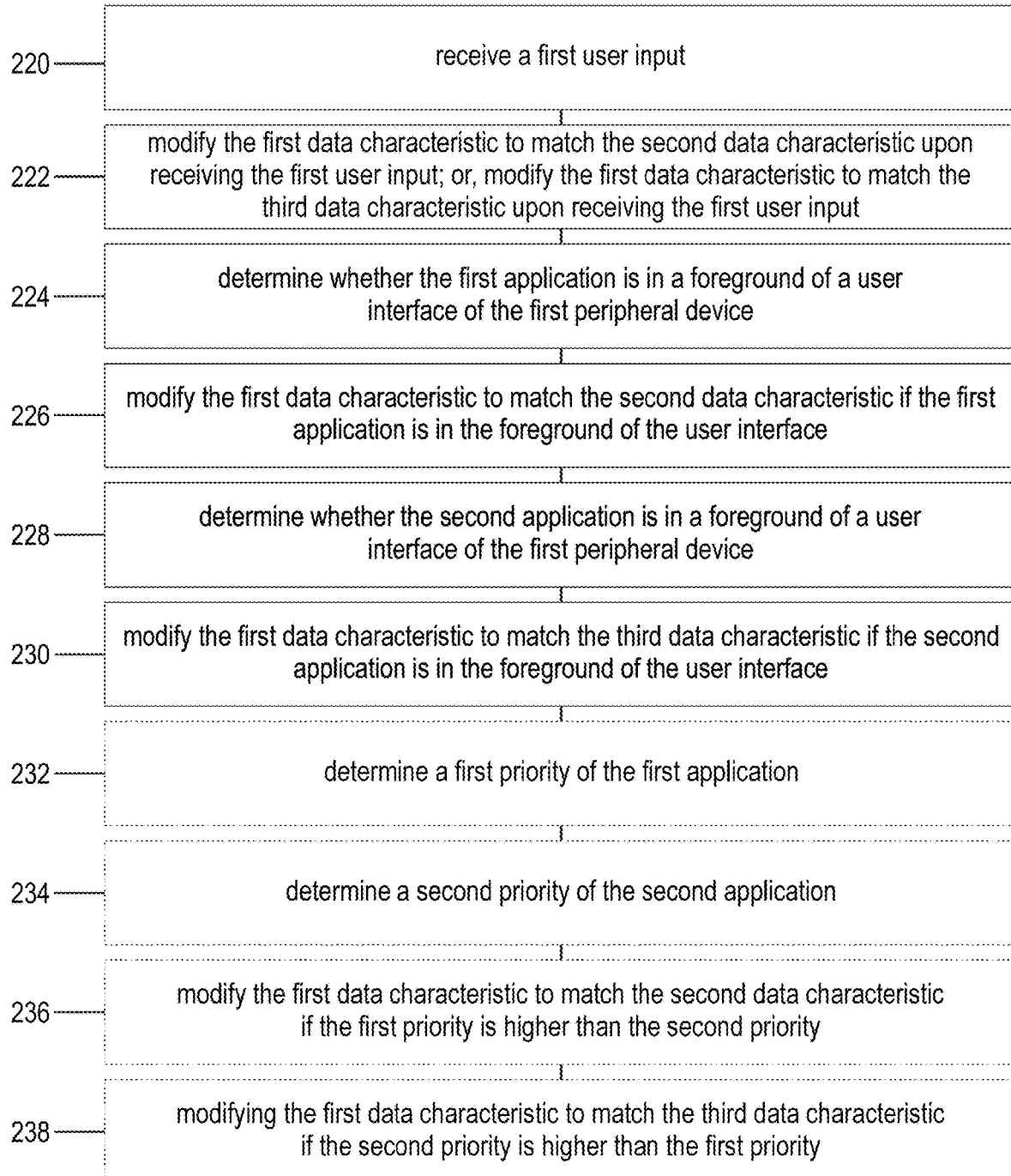
FIG. 5B is a flow-chart illustrating the steps of a method according to the present disclosure.

FIGS. 5A-5B illustrate the steps of method 200 according to the present disclosure. Method 200 includes, for example, providing a first wearable audio device having a speaker, a first communication module, and a sensor (step 202); establishing, via circuitry of a first peripheral device, a first connection over a first protocol between the first wearable audio device and the first peripheral device (step 204); obtaining, via the first communication module, a first data characteristic of the first wearable audio device (step 206); obtaining, via the first communication module, a second data characteristic of a first application running on the first peripheral device (step 208); obtaining, via the first communication module, a third data characteristic of a second application running on the first peripheral device (step 210); comparing the first data characteristic of the first wearable audio device with the second data characteristic of the first application (step 212); comparing the first data characteristic of the first wearable audio device with the third data characteristic of the second application (step 214); and, sending the sensor data obtained from the sensor of the first wearable audio device to the first peripheral device for use with the first application if the first data characteristic of the first wearable audio device and the second data characteristic of the first application match (step 216); or, sending the sensor data obtained from the sensor of the first wearable audio device to the first peripheral device for use with the second application if the first data characteristic of the first wearable audio device and the third data characteristic of the second application match (step 218).

As shown in FIG. 5B, method 200 may further include: receiving a first user input (step 220); and modifying the first data characteristic to match the second data characteristic upon receiving the first user input; or, modifying the first data characteristic to match the third data characteristic upon receiving the first user input (step 222). Additionally, method 200 may include: determining whether the first application is in a foreground of a user interface of the first peripheral device (step 224); and, modifying the first data characteristic to match the second data characteristic upon determining that the first application is in the foreground of the user interface (step 226); or, determining whether the second application is in a foreground of a user interface of the first peripheral device (step 228); and, modifying the first data characteristic to match the third data characteristic upon determining that the second application is in the foreground of the user interface (step 230). Alternatively, method 200 may include: determining a first priority of the first application (step 232); determining a second priority of the second application (step 234); and, modifying the first data characteristic to match the second data characteristic if the first priority is higher than the second priority (step 236); or modifying the first data characteristic to match the third data characteristic if the second priority is higher than the first priority (step 238).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for sending sensor data, the method comprising:
   providing a first wearable audio device having a speaker, a first communication module, and a sensor;
   establishing, via circuitry of a first peripheral device, a first connection over a first protocol between the first wearable audio device and the first peripheral device;
   obtaining, via the first communication module, a first data characteristic of the first wearable audio device;
   obtaining, via the first communication module, a second data characteristic of a first application running on the first peripheral device;
   comparing the first data characteristic of the first wearable audio device with the second data characteristic of the first application;
   sending the sensor data obtained from the sensor of the first wearable audio device to the first peripheral device for use with the first application if the first data characteristic of the first wearable audio device and the second data characteristic of the first application match; and
   modifying the first data characteristic to match the second data characteristic upon receipt of a user input, upon a determination that the first application is in the foreground of a user interface of the peripheral device, or based on determining a first priority of the first application.

2. The method of claim 1, further comprising:
   obtaining, via the first communication module, a third data characteristic of a second application running on the first peripheral device;
   comparing the first data characteristic of the first wearable audio device with the third data characteristic of the second application; and,
   sending the sensor data obtained from the sensor of the first wearable audio device to the first peripheral device for use with the second application if the first data characteristic of the first wearable audio device and the third data characteristic of the second application match.

3. The method of claim 2, further comprising:
   determining the first priority of the first application;
   determining a second priority of the second application; and,
   modifying the first data characteristic to match the third data characteristic if the second priority is higher than the first priority.

4. The method of claim 1, wherein the first user input is selected from: a hardware input, a gesture input, data obtained from a gyroscope, data obtained from an accelerometer, or data obtained from a magnetometer.

5. The method of claim 2, further comprising:
   receiving a first user input; and,
   modifying the first data characteristic to match the third data characteristic upon receiving the first user input.

6. The method of claim 2, further comprising:
   determining whether the second application is in a foreground of a user interface of the first peripheral device; and,
   modifying the first data characteristic to match the third data characteristic upon determining that the second application is in the foreground of the user interface.

7. The method of claim 1, wherein the first wearable audio device further comprises a memory arranged to store a set of non-transitory computer readable instructions and a processor arranged to execute the set of non-transitory computer readable instructions, wherein the memory is further arranged to store a firmware data set.

8. The method of claim 7, wherein the firmware data set comprises the first data characteristic and the first data characteristic is obtained from at least a portion of the first protocol used in the first connection.

9. The method of claim 1, wherein the first application contains a first application data set wherein the first application data set comprises the second data characteristic, and wherein the second data characteristic is obtained from the first application data sent via at least a portion of a first protocol used in the first connection.

10. The method of claim 1, wherein the second application contains a second application data set wherein the second application data set comprises the third data characteristic, and wherein the third data characteristic is obtained from the second application data sent via at least a portion of the first protocol used in the first connection.

11. The method of claim 1, wherein the sensor is selected from: a gyroscope, an accelerometer, and/or a magnetometer.

12. An audio system comprising:
a first wearable audio device comprising:
a speaker;
a first communication module arranged to establish a first connection with a first peripheral device and obtain a first data characteristic of the first wearable audio device, and obtain a second data characteristic of a first application running on a first peripheral device; and,
a sensor arranged to obtain a sensor data;
wherein the first wearable audio device or the first peripheral device are arranged to:
(i) compare the first data characteristic and the second data characteristic;
(ii) send or receive the sensor data obtained from the sensor to the first peripheral device for use with the first application if the first data characteristic and the second data characteristic match; and
(iii) modify the first data characteristic to match the second data characteristic upon receipt of a user input, upon a determination that the first application is in the foreground of a user interface of the peripheral device, or based on determining a first priority of the first application.

13. The system of claim 12, wherein the first communication module is further arranged to obtain a third data characteristic of a second application running on the first peripheral device and the first wearable audio device or the first peripheral device are further arranged to:
compare the first data characteristic with the third data characteristic of the second application; and,
send or receive the sensor data obtained from the sensor to the first peripheral device for use with the second application if the second data characteristic and the third data characteristic match.

14. The system of claim 12, wherein the first user input is selected from: a hardware input, a gesture input, data obtained from a gyroscope, data obtained from an accelerometer, or data obtained from a magnetometer.

15. The system of claim 13, wherein the first wearable audio device or the first peripheral device are further arranged to:
receive a first user input; and,
modify the first data characteristic to match the third data characteristic upon receiving the first user input.

16. The system of claim 13, wherein the first wearable audio device or the first peripheral device are further arranged to:
determine whether the second application is in a foreground of a user interface of the first peripheral device; and,
modify the first data characteristic to match the third data characteristic upon determining that the second application is in the foreground of the user interface.

17. The system of claim 13, wherein the first wearable audio device or the first peripheral device are further arranged to:
determine the first priority of the first application;
determine a second priority of the second application; and,
modify the first data characteristic to match the third data characteristic if the second priority is higher than the first priority.

18. The system of claim 12, wherein the first wearable audio device further comprises a memory arranged to store a set of non-transitory computer readable instructions and a processor arranged to execute the set of non-transitory computer readable instructions, wherein the memory is further arranged to store a firmware data set.

19. The system of claim 18, wherein the firmware data set comprises the first data characteristic and the first data characteristic is obtained from at least a portion of the first protocol used in the first connection.

20. The system of claim 13, wherein the first application contains a first application data set wherein the first application data set comprises the second data characteristic, and wherein the second data characteristic is obtained from the first application data sent via at least a portion of a first protocol used in the first connection.

21. The system of claim 13, wherein the second application contains a second application data set wherein the second application data set comprises the third data characteristic, and wherein the third data characteristic is obtained from the second application data sent via at least a portion of the first protocol used in the first connection.

22. The system of claim 12, wherein the sensor is selected from: a gyroscope, an accelerometer, and/or a magnetometer.

23. A method for sending sensor data, the method comprising:
providing a first wearable audio device having a speaker, a first communication module, and a sensor;
establishing, via circuitry of a first peripheral device, a first connection over a first protocol between the first wearable audio device and the first peripheral device;
obtaining, via the first communication module, a first data characteristic of the first wearable audio device;
obtaining, via the first communication module, a second data characteristic of a first application running on the first peripheral device;
comparing the first data characteristic of the first wearable audio device with the second data characteristic of the first application; and,
sending the sensor data obtained from the sensor of the first wearable audio device to the first peripheral device for use with the first application if the first data characteristic of the first wearable audio device and the second data characteristic of the first application match;
modifying the first data characteristic to match the second data characteristic upon a determination that the first application is in the foreground of a user interface of the peripheral device.

* * * * *